United States Patent
McHugh et al.

(10) Patent No.: US 6,418,204 B1
(45) Date of Patent: *Jul. 9, 2002

(54) DATA INTERFACE APPARATUS AND METHOD

(75) Inventors: Thomas Francis Harold McHugh, Sevenoaks; Howard Feldman, Kenton, both of (GB)

(73) Assignee: International Mobile Satellite Organization, London (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 18 days.

(21) Appl. No.: 08/904,313

(22) Filed: Jul. 31, 1997

(30) Foreign Application Priority Data

Jul. 31, 1996 (GB) .............................. 9616041

(51) Int. Cl.⁷ .............................................. H04M 11/00
(52) U.S. Cl. ............................... 379/93.02; 379/93.05; 379/93.32; 455/13.2
(58) Field of Search ........................... 379/90.01, 91.01, 379/92.03–92.04, 93.01, 93.05–93.08, 93.15, 93.29–93.34, 100.12–100.13, 100.05–100.07, 100.09, 102.04; 455/12.01, 13.01, 13.02, 33.1, 311, 403, 557; 375/222, 231; 370/324, 466, 503

(56) References Cited

U.S. PATENT DOCUMENTS

| | | | | |
|---|---|---|---|---|
| 5,166,977 A | | 11/1992 | Ross ..................... 379/100.17 |
| 5,191,323 A | * | 3/1993 | Abbes et al. .......... 379/102.04 |
| 5,404,394 A | * | 4/1995 | Dimolitsas et al. .... 379/100.12 |
| 5,499,241 A | * | 3/1996 | Thompson et al. .......... 455/3.1 |
| 5,570,389 A | * | 10/1996 | Rossi ........................ 455/557 |
| 5,574,773 A | * | 11/1996 | Grob et al. ................ 455/33.1 |
| 5,587,810 A | * | 12/1996 | Feldman ................ 379/100.09 |
| 5,613,195 A | * | 3/1997 | Ooi ............................ 455/13.2 |
| 5,722,066 A | * | 2/1998 | Hu ............................. 455/557 |
| 5,752,199 A | * | 5/1998 | Scott .......................... 375/222 |
| 5,761,282 A | * | 6/1998 | Hsu ..................... 379/100.05 |
| 5,787,363 A | * | 7/1998 | Scott et al. ................. 455/557 |
| 5,802,154 A | * | 9/1998 | Dimolitsas et al. ..... 379/100.17 |

FOREIGN PATENT DOCUMENTS

| | | |
|---|---|---|
| EP | 0 670 650 A1 | 3/1995 |
| EP | 0670650 A1 | 9/1995 |
| GB | 2 271 485 A | 9/1993 |
| GB | 2271485 A | 4/1994 |

* cited by examiner

*Primary Examiner*—Sinh Tran
*Assistant Examiner*—George Eng
(74) *Attorney, Agent, or Firm*—Banner & Witcoff, Ltd.

(57) ABSTRACT

A data interface apparatus (10) provides an interface between an analog communications link ($a_2$) and a digital communications link ($d_2$). Analog dialling codes on the analog communications link ($a_2$) are converted to control codes for controlling a digital communications interface (12) attached to the digital communications link ($a_2$) for providing access to a digital communications network (16, 18, 20).

Access to the digital communications link ($a_2$) is selectively enabled by the data interface apparatus (10) in response to a password encoded as an analog dialling sequence on the analog communications link ($a_2$)

The data interface apparatus (10) delays call set-up with a modem (6) connected to the analog communications link ($a_1,a_2$) so as to synchronize completion of call set-up with another call set-up procedure performed on a remote analog link ($a_3,a_4$) connected to the digital communications network (16, 18, 20).

12 Claims, 8 Drawing Sheets

DATA INTERFACE APPARATUS AND METHOD

The present invention relates to a data interface apparatus and method, particularly but not exclusively for providing an interface for data communications between an analog communications link and a digital communications network.

The use of digital communications networks is becoming widespread, as they provide a number of advantages over analog networks. For example, the Inmarsat-B™ satellite communication system is replacing the Inmarsat-A™ system and provides more efficient use of bandwidth as well as more advanced facilities for voice, data and facsimile communications. In another example, digital terrestrial cellular systems are gradually replacing analog terrestrial cellular systems.

However, much analog communications equipment is still in use and it is not always economical to replace an entire analog system by a digital equivalent.

For example, many large passenger ships are fitted with two-wire communications links connected to a private automatic branch exchange (PABX). It would be desirable to connect such a two-wire system to an Inmarsat-B™ ship earth station (SES), but such equipment typically provides only a digital RS232C port for connection to data terminal equipment (DTE). A local area network may be installed in such ships, but the cost of installing such a network can be prohibitively high.

The document U.S. Pat. No. 5,166,977 discloses an interface for connection between a Group 3 fax machine having an RJ11 connection and a secure telephone unit (STU) having an RS-232 connection.

According to one aspect of the present invention, there is provided an interface which allows an analog communications system to be connected to a digital communications network for which a digital interface is already provided and which converts analog dialling signals from the analog communication system to is digital control codes for output on a digital port to the digital interface. The digital control codes may comprise digital dialling codes and/or codes for controlling the setting of the digital interface. They may for example be AT codes complying with ITU Recommendation V25ter.

According to another aspect of the present invention, there is provided an interface between an analog communications link and a digital communications link, which receives a password encoded as analog dialling signals from the analog communications link and enables connection to the digital communications link if the correct password is received.

According to another aspect of the present invention there is provided a data communications interface which is connected between first and second analog communications sublinks at the remote end of which are connected respectively first and second modems. The interface delays the completion of training on one of the sublinks so as to synchronise completion of training over each of the sublinks. The delaying may be performed by setting a timer from a call setup event over the first sublink and beginning training over the first sublink after a predetermined period has expired.

The interface may be connected to a further interface over a wireless communications sublink, the further interface being connected between the wireless communications sublink and the second communications sublink and operable to send call status information over the wireless sublink. In this case, the communications interface may start training the first modem in response to the start of training of the second modem by the remote interface. Alternatively, or additionally, once training has begun over the first and second sublinks, either interface may delay completion of training with its respective modem by retarding training, for example by not responding to the first transmission of a training signal by the respective modem. In this way, the likelihood of either of first and second terminals connected respectively to the first and second modems timing out because no data is received from the other data terminal after completion of training is reduced.

Specific embodiments of the present invention will now be described with reference to the accompanying drawings, in which:

FIG. 3b is a protocol diagram showing an alternative to FIG. 3a;

COMMUNICATIONS LINKS

Figure 1:
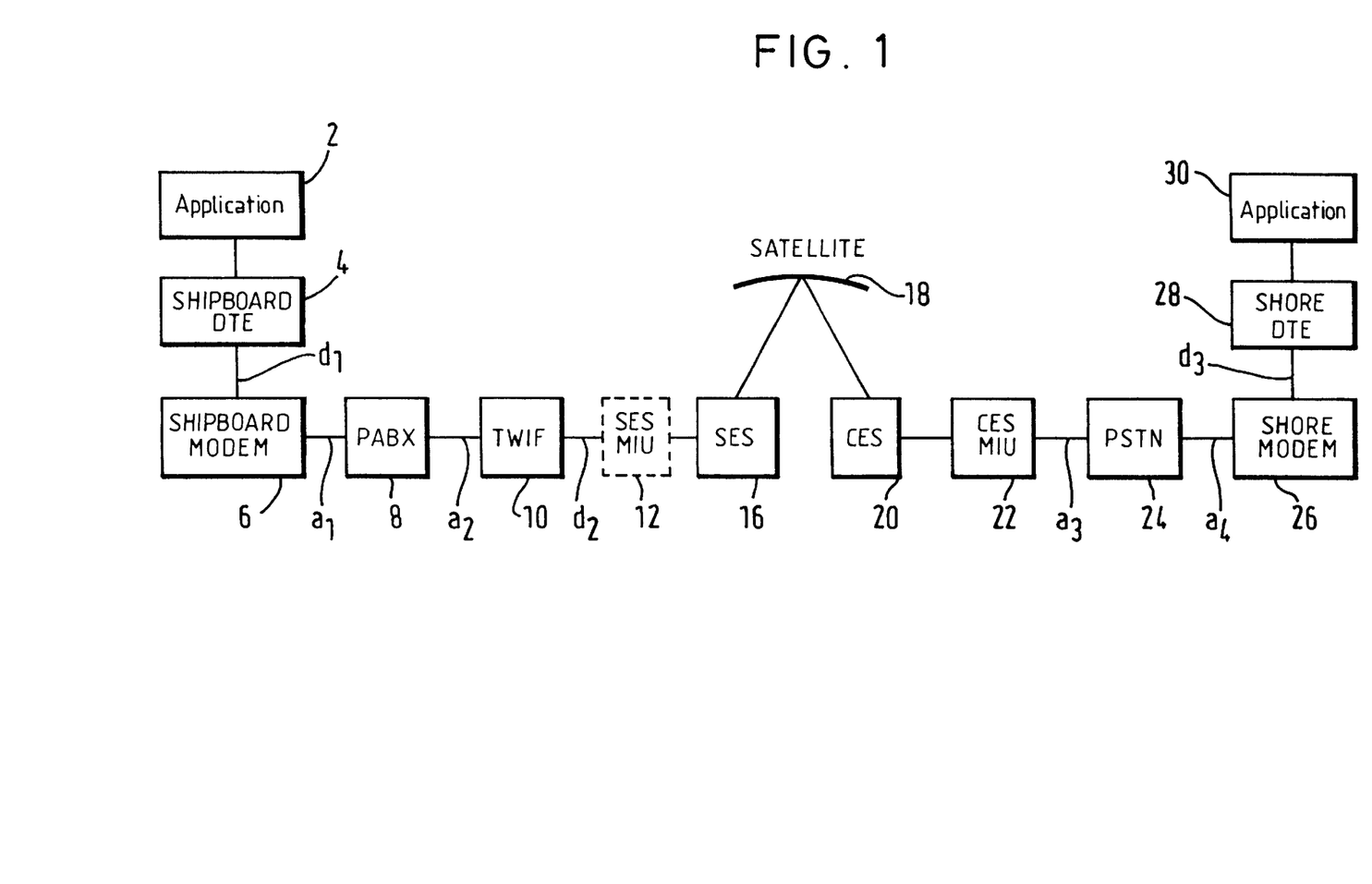
FIG. 1 is a schematic diagram showing a connection between a shipboard data terminal and a land-based data terminal over a satellite link.

As shown in FIG. 1, a user application program 2 is active on a shipboard data terminal 4. The user application program may be an E-mail or file transfer program capable of transmitting and receiving data through an RS232 input/output port of the data terminal 4, which may be a PC-compatible or Macintosh™ computer, a Unix workstation or a low cost internet terminal.

The I/O port of the data terminal 4 is connected over a first digital link $d_1$, such as an RS232 cable or an internal bus connector to a shipboard modem 6 of a standard type, supporting for example the ITU V.32 or V.32bis data rate and V.42 error correction and flow control. As is well known, such modems provide an interface between a digital communications link (such as $d_1$) and an analog link (in this case $a_1$) to enable data communication to take place over the analog line. The modem 6 is also responsive to Hayes-type AT commands on the digital link $d_1$, which control the setup and dialling operations of the shipboard modem 6. The AT commands are as defined in ITU recommendation V.25ter.

In this case, the ship is equipped with a PABX 8 which is an analog exchange for providing connections between telephone extensions on a ship. The ship is also equipped with a ship earth station (SES) 16 which provides an interface to a mobile satellite link via a satellite 18 to a coast earth station (CES) 20. For example, the satellite 18 may be an Inmarsat-3™ geostationary satellite and the SES 16 and CES 20 may support the Inmarsat-B™ satellite services.

To enable data communications over the satellite link, the SES 16 is connected to an SES modem interface unit (MIU) 12, which emulates a modem by responding to AT-type commands but does not include a modulator and demodulator; it receives and transmits data through an RS232C port connected to a second digital communications link $d_2$. Between a second analog link $a_2$ and the second digital link $d_2$ is provided a two-wire data interface 10 according to an embodiment of the present invention. As will be described in more detail below, the two-wire data interface unit (TWIF) 10 enables the analog PABX 8 to be connected to the digital SES MIU 12.

Specific details of a modem interface unit may be found in UK Patent Application Nos. 9506759.1 and 9512283.4, incorporated herein by reference.

As an alternative, the modem 6 may be connected to the TWIF 10 by a single analog line, without connection through the PABX 8.

The CES 20 is connected to a CES modem interface unit (MIU) 22, which may incorporate a V.32 or V.32bis modem. This modem enables the CES MIU 22 to be connected to a third analog link $a_3$ of a PSTN 24, through which the CES MIU 22 is connected via a fourth analog link $a_4$ to a shore-based modem 26 which, like the shipboard modem 6, demodulates analog signals from the analog line and converts them to digital signals on the digital line, and vice versa.

The shore-based modem 26 is connected to a shore-based data terminal 28 via a third digital link $d_1$ of similar type to the first digital link $d_3$. A data communications application 30 is active on the shore-based data terminal 28 and exchanges data with the ship-based application 2.

The connection between the shipboard data terminal 4 and the shore-based data terminal 28 therefore involves a connection over two analog networks interconnected by a digital network, in this case the mobile satellite communications network. At either end of each of the analog networks is a modem for converting analog modulated signals to digital data and vice versa. On the shipboard side of the satellite link, the analog network is constituted by the PABX 8 having the shipboard modem 6 connected on one side and the TWIF 10 on the other.

Two-Wire Data Interface

Figure 2:
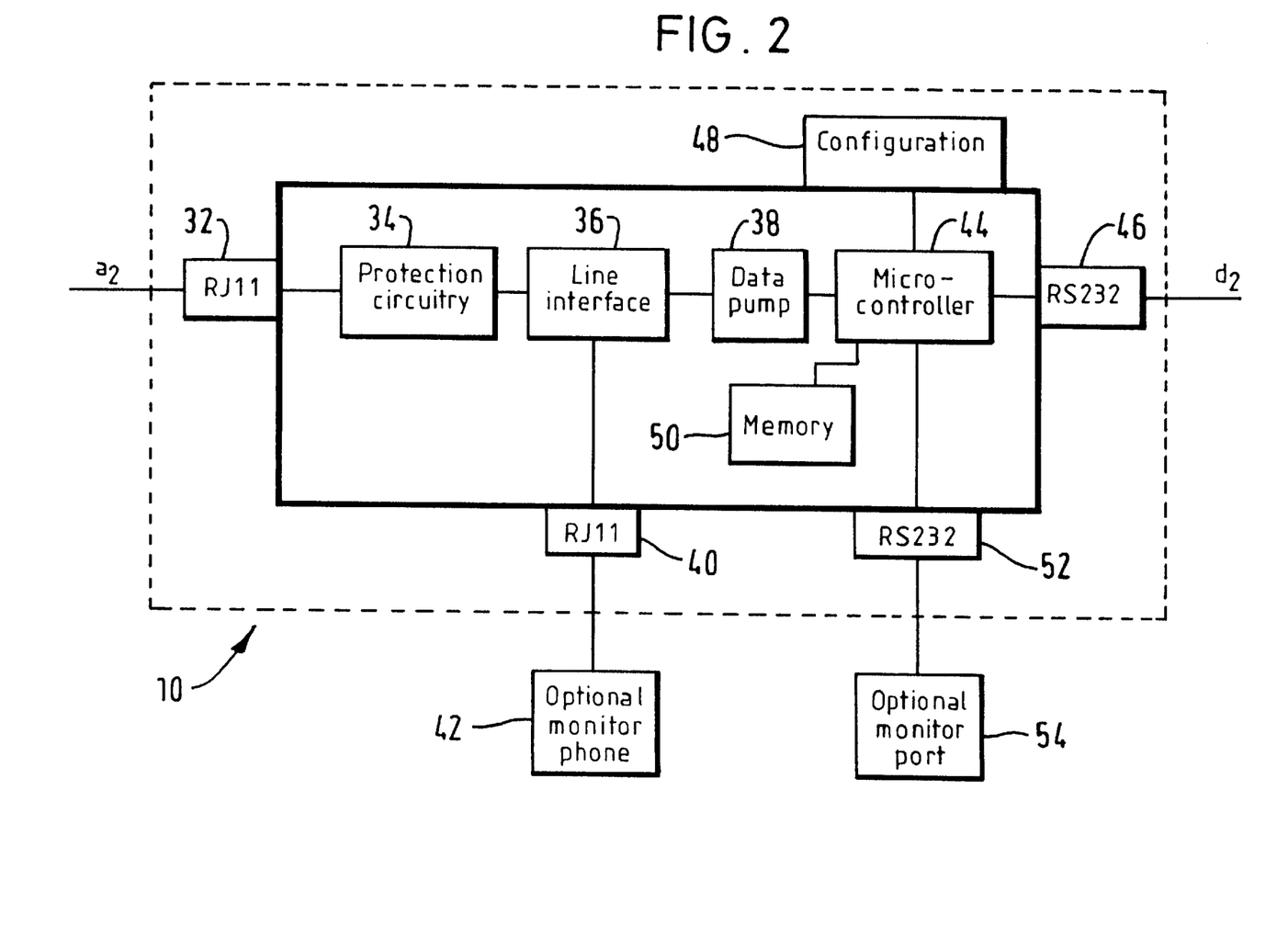
FIG. 2 is a detailed schematic diagram of a two-wire data interface of FIG. 1 in an embodiment of the present invention.

FIG. 2 shows one example of the configuration of the TWIF 10.

The TWIF 10 is connected to the second analog line $a_2$ by means of a modem port 32, such as an RJ11 two-wire interface. The modem port 32 is connected to protection circuitry 34 which protects the TWIF 10 from high voltages which may be present on the analog line $a_2$. Modem circuitry 38, such as a data pump, is connected to the modem port 32 through the protection circuitry 34 and a line interface 36. Optionally, an audio monitor 42, which may be a conventional telephone handset, is connected to the line interface 36 via a further two-wire port 40, for providing audio monitoring of the analog line $a_2$.

The modem circuit 38 converts analog signals received from the line interface 36 to digital signals which are output to a micro-controller 44, which outputs data to and receives data from an RS232 port 46 according to a set of two-wire data interface protocols, which will be illustrated below. The operating modes of the micro-controller are configured by a configuration apparatus 48 which may comprise external switches or a port to a control terminal. The micro-controller 44 is connected to a memory 50, which may comprise a read-only memory (ROM) for storing programs to be executed by the micro-controller 44 and random access memory (RAM) for storing operating variables and for buffering data. The micro-controller may optionally be connected to a further RS232 port 52, for connection to a monitor terminal 54 for monitoring the operation of the micro-controller 44. The monitor terminal 54 may also be connected to the configuration apparatus 48 through the further RS232C port 52.

The modem circuitry 38 detects dialling tones, such as DTMF tones, or pulses input at the modem port 32 and converts them to their digital equivalents, which are sent to the micro-controller 44. The micro-controller 44 converts these digital equivalents to Hayes-compatible AT dialling and control codes for output to the RS232 port 46. These AT commands are compatible with the SES MIU 12. In this way, the SES MIU 12 can be accessed by equipment connected to analog lines, such as two-wire lines.

Single Stage Dialling

Figure 3A:
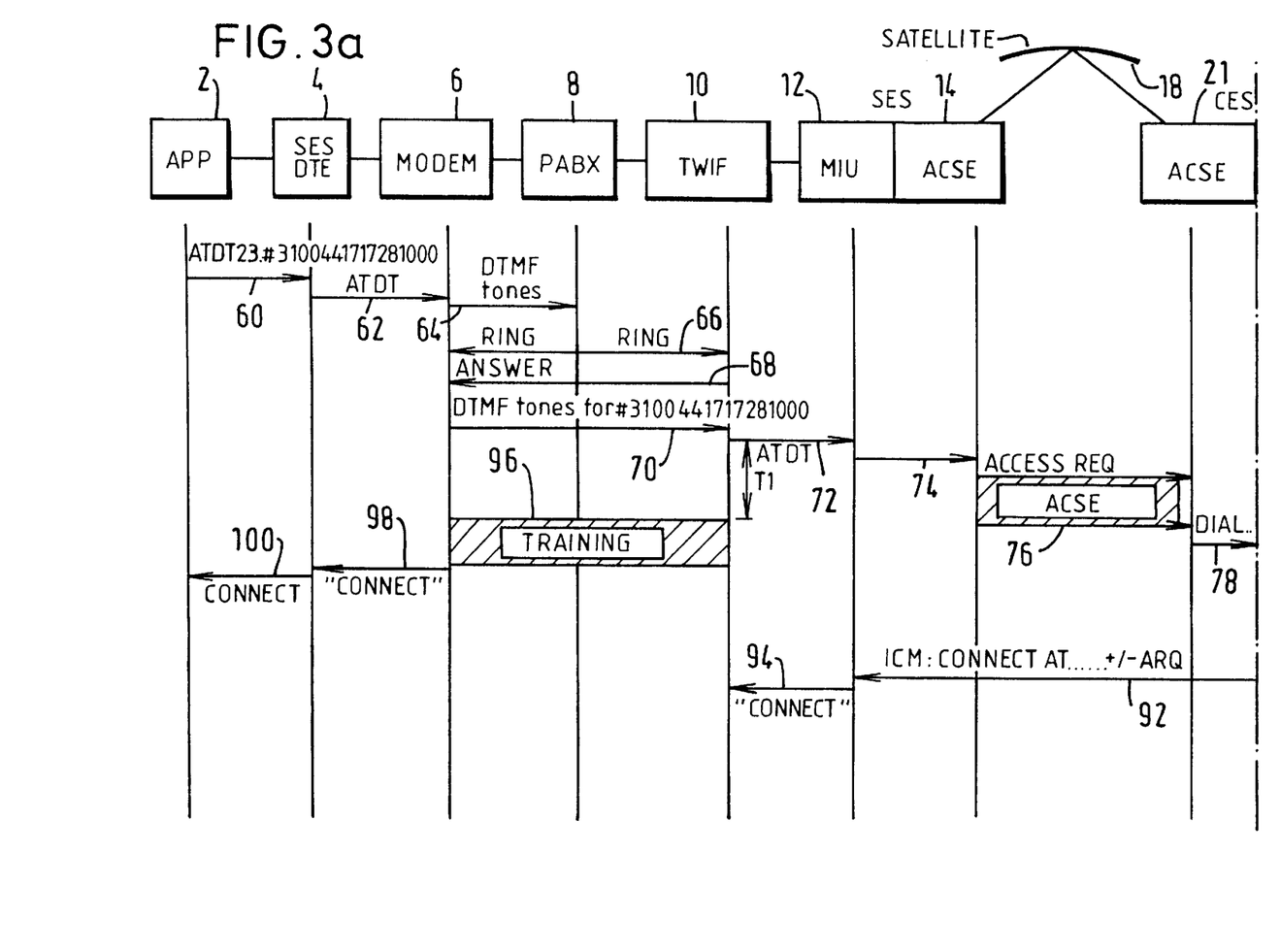
FIG. 3a is a protocol diagram showing a call set up initiated at the shipboard data terminal of FIG. 1.

A protocol exchange showing an example of this function will now be described with reference to the protocol diagram of FIG. 3a.

A data communication session is initiated by the application 2 controlling the shipboard DTE 4, at step 60, to send an ATD (AT dial string) command comprising a dialling code for the PABX 8, a code for controlling the setting of the SES MIU 12 and the telephone number of the intended recipient of the data call. At step 62, the ATD command is passed to the modem 6, which generates DTMF tones, at step 64, to control the PABX 8 to connect the modem 6 to the TWIF 10. At step 66, the PABX 8 provides a ringing signal to the TWIF 10 and a ringing indication to the modem 6. At step 68, the TWIF 10 goes off-hook and optionally provides an answer signal to the modem 6.

At step 70, the modem 6 generates the DTMF tones for the remainder of the ATD string generated by the application 2. At step 72, the TWIF 10 converts these DTMF tones back to a corresponding ATD sequence which is sent to the SES MIU 12. At step 74, the dialling codes are sent to access control and signalling equipment (ACSE) 14, which forms part of the SES 16. The ACSE 14 controls channel set-up over a satellite link, at step 76, by communication with further ACSE equipment 21 at the CES 20.

At step 78, the dialling codes received from the ACSE 14 are sent to the CES MIU 22, which converts the dialling codes into corresponding DTMF tones at step 80. The DTMF tones are sent to the PSTN 24, which connects the CES MIU 22 to the called modem, in this case the shore-based modem 26. At step 82, the PSTN 24 sends a ringing signal to the shore-based modem 26, which in turn sends a ringing indication at step 84 to the shore-based data terminal 28. The shore-based data terminal 28 responds with an answer signal at step 86, in response to which at step 88, the shore-based modem 26 goes off-hook and begins modem training with the CES MIU 22. Once training has been completed successfully, the shore-based modem 26 sends a connect indication at step 90 to the shore-based data terminal equipment 28.

In response to completion of the modem training step, the CES MIU 22 sends (step 92) a line control message (LCM), indicating that the connection was successful and further indicating the parameters set during modem training, over the satellite link to the SES MIU 12, which sends (step 94) a connect indication to the two-wire data interface 10.

Delayed Training

The applications 2 and 30 are typically designed for data communication over a PSTN, and include no special features for compensating for connection over communications links incurring long delays, such as satellite communications links. Such applications will usually set a timer from the initiation of a dialling sequence and will time out and end the call attempt if no response is received from the associated modem within a predetermined time. Likewise, once the associated modem has sent a connect indication to the data terminal, the application may time out if no data is received from the remote application within a predetermined time. Therefore, in response to the sending of the ATD sequence at step 72, the two-wire data interface 10 sets a timer. When a predetermined period $T_1$ has elapsed, as determined by the timer, the two-wire data interface sends an answer signal to the modem 6 and begins training at step 96, despite the fact that no response has been received from the SES MIU 12. Once the training step 96 is complete, the modem 6 sends a connect indication to the shipboard DTE 4, which indicates at step 100 to the application that a connection has been made. The TWIF 10 likewise enters a connect state.

The time period $T_1$ is determined so that the training at step 88 over the shore-based link and the training at step 96 over the ship-based link is completed at approximately the same time, so that both applications 2 and 30 are ready to exchange data at approximately the same time and neither is likely to time out as a result of excessive delay in receiving data from the other application. However, the time period $T_1$ is sufficiently short that the application 2 does not time out because no connection was indicated within a predetermined period after dialling initiation at step 60.

The period $T_1$ may be variable and may be set by the configuration apparatus 48 or by the shipboard DTE 4 using the TWIF control method described below.

As an alternative, the SES MIU 12 may send a connect indication to the two-wire data interface 10 in response to completion of channel setup at step 76, and the TWIF 10 may set a timer in response to the connect indication and initiate the training step 96 after a time period $T_2$ has elapsed. However, this requires modification of the SES 16. The use of a timer by the two-wire data interface is preferred, since it enables the two-wire data interface 10 to be used in conjunction with unmodified satellite earth station software.

Figure 3B:
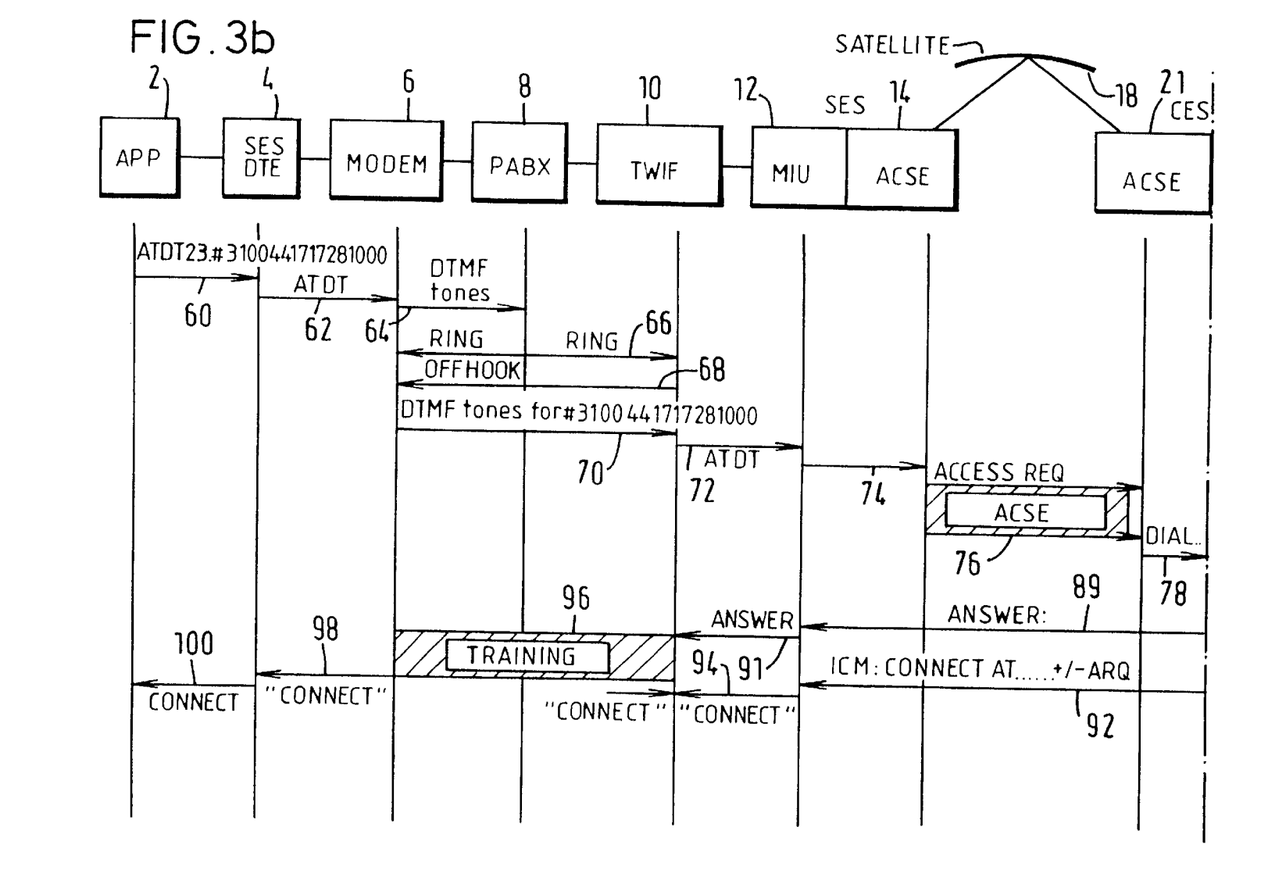

In another alternative shown in FIG. 3b, the CES MIU 22 sends an answer indication 89 over the satellite link in response to the beginning of training at step 88. In response to receipt of the answer indication 89, the SES MIU 12 sends a corresponding answer indication 91 to the TWIF 10, in response to which the TWIF 10 begins the training step 96, either immediately or after a period determined by a timer.

In an additional alternative, the SES 16 and the CES 20 exchange progress signals during the training steps 88 and 96 representing the progress of the training steps, with the TWIF 10 supplying progress signals to the SES MIU 12. If the training step 88 is advanced with respect to the training step 96, according to progress signals received by the CES 20, the CES MIU 22 delays the progress of the training step 88 so as to allow the training step 96 to reach the same stage according to the received progress signals. Likewise, if the training step 96 is advanced with respect to the training step 88, according to the progress signals received by the SES 16, the TWIF 10 delays the progress of the training step 96 so as to allow the training step 96 to reach the same stage according to the received progress signals. The training steps may be delayed by not responding to the first occurrence of a training signal, for example. This additional alternative may be performed in conjunction with any of the methods of delaying the onset of training as described above.

Dialling Signal Conversion

The two-wire data interface 10 operates in a reverse manner to a conventional modem, in that it receives DTMF tones or other dialling signals and outputs, in response thereto, AT commands, whereas conventional modems receive AT commands and generate, in response thereto, DTMF tones or other dialling signals. This advantageous feature allows equipment designed for connection to a data terminal, such as the SES MIU 12, to be connected to an analog line. This feature will now be explained by examining in greater, detail the shipboard protocol sequence of FIG. 3b.

At step 60, the application generates an AT dial string of the following format:

ATD [P/T][PABX][W][*CC][SES Dial String]#

The items in square brackets are described below in Table 1.

TABLE 1

| Parameter | Description |
| --- | --- |
| [P/T] | Pulse or tone command to modem 6. If not included the modem will dial according to its default settings. |
| [PABX] | PABX number(s) for connection to TWIF 10. |
| [W] | Wait character(s). Depending on implementation of TWIF 10 and PABX 8 this may be a ',' '@' or other appropriate delay character. |
| [*$C_1C_2$] | '*' character followed by two digits {0–9}. The digits are the single stage dialling TWIF Control digits (specification below). |
| [SES Dial String] | Same as dial string that would be entered by a DTE directly connected to MIU 12. |
| # | End of Dialling Character |

The PABX number is omitted if the modem 6 is connected directly to the TWIF 10.

The TWIF control digits [*CC] are control codes specific to the TWIF 10 and may be omitted, if the application 2 is not configured for use with the TWIF 10.

The first control digit $C_1$ controls the error correction setting of the satellite link and the link over the PSTN 24, as shown below in Table 2.

TABLE 2

| | | Description | | |
| --- | --- | --- | --- | --- |
| $C_1$ | Designation | Satellite link | Terrestrial Link | End-to-End |
| 0 | +WS45 = 0 | NARQ | NARQ | NARQ |
| 1 | +WS45 = 1 | ARQ | ARQ | ARQ |
| 2 | +WS45 = 200 | NARQ | ARQ | NARQ |
| 3 | +WS45 + 201 | ARQ | NARQ | NARQ |
| 4–9 | | reserved | | |

The second control digit $C_2$ controls the data rate selected for the satellite link and the terrestrial link over the PSTN 24, as shown below in Table 3.

TABLE 3

| $C_2$ | Designation | Satellite rate | Terrestrial rate |
| --- | --- | --- | --- |
| 1 | +WRATE = 9600, 1200 | 9600 | 1200 |
| 2 | +WRATE = 9600, 2400 | 9600 | 2400 |
| 3 | +WRATE = 9600, 4800 | 9600 | 4800 |
| 4 | +WRATE = 9600, 9600 | 9600 | 9600 |
| 5 | +WRATE = 9600, 14400 | 9600 | 14400 |
| 0, 6–9 | | reserved | |

In response to receipt of the star character followed by the control digits $C_1$ and $C_2$, the TWIF 10 generates the AT commands shown above in the designation columns of Tables 1 to 3 and sends the designated AT commands to the SES MIU 12.

Table 4 below shows examples of the AT commands generated by the TWIF 10 in response to the control digits $C_1$ and $C_2$.

TABLE 4

| $C_1C_2$ | TWIF Interpretation |
|---|---|
| 31 | +WS45 = 201 +WRATE = 9600, 1200 |
| 33 | +WS45 = 201 +WRATE = 9600, 4800 |
| 25 | +WS45 = 200 +WRATE = 9600, 14400 |

If no control digits are included in the dial string, the TWIF 10 sends default setup commands to the MIU 12. Alternatively, the default data rate and error correction may be programmed into the SES 16 and do not need to be sent to the MIU 12.

At step 64, modem 6 sends the PABX number to the PABX and pauses in response to the wait character [W]. At step 70, after the modem 6 has paused in response to the wait character [W], it then sends dial tones corresponding to the remainder of the dial string, comprising the optional control digits [*CC] followed by the SES dial string.

Alternatively, if the PABX 8 is of a type which automatically stores additional dialling tones received after PABX dialling tones and sends the additional dialling tones to the called extension after that extension goes off-hook, the wait character [W] may be omitted.

At step 72, the TWIF 10 sends the configuration setup AT commands as discussed above with reference to Tables 2 to 4 to the SES MIU 12, together with the SES dial string in AT format. The SES 16 sets its configuration according to the setup AT commands, and sends the SES dial string over the satellite link so that the CES MIU 22 dials the shore-based modem 26 over the PSTN 24. Thus, a single dialling string generated by the shipboard DTE 4 controls PABX dialling, SES setup and remote dialling over the shore-based PSTN 24.

The SES dialling string may be an international telephone number, or a short code which causes the SES 16 to send an international telephone number over the satellite link, or a short code which is sent over the satellite link to control a function at the CES 20, such as an E-mail storage function. The SES dialling string may also include routing control codes which control the call set-up over the satellite link by the SES ACSE 14.

Two-wire Data Interface Control

Figure 4:
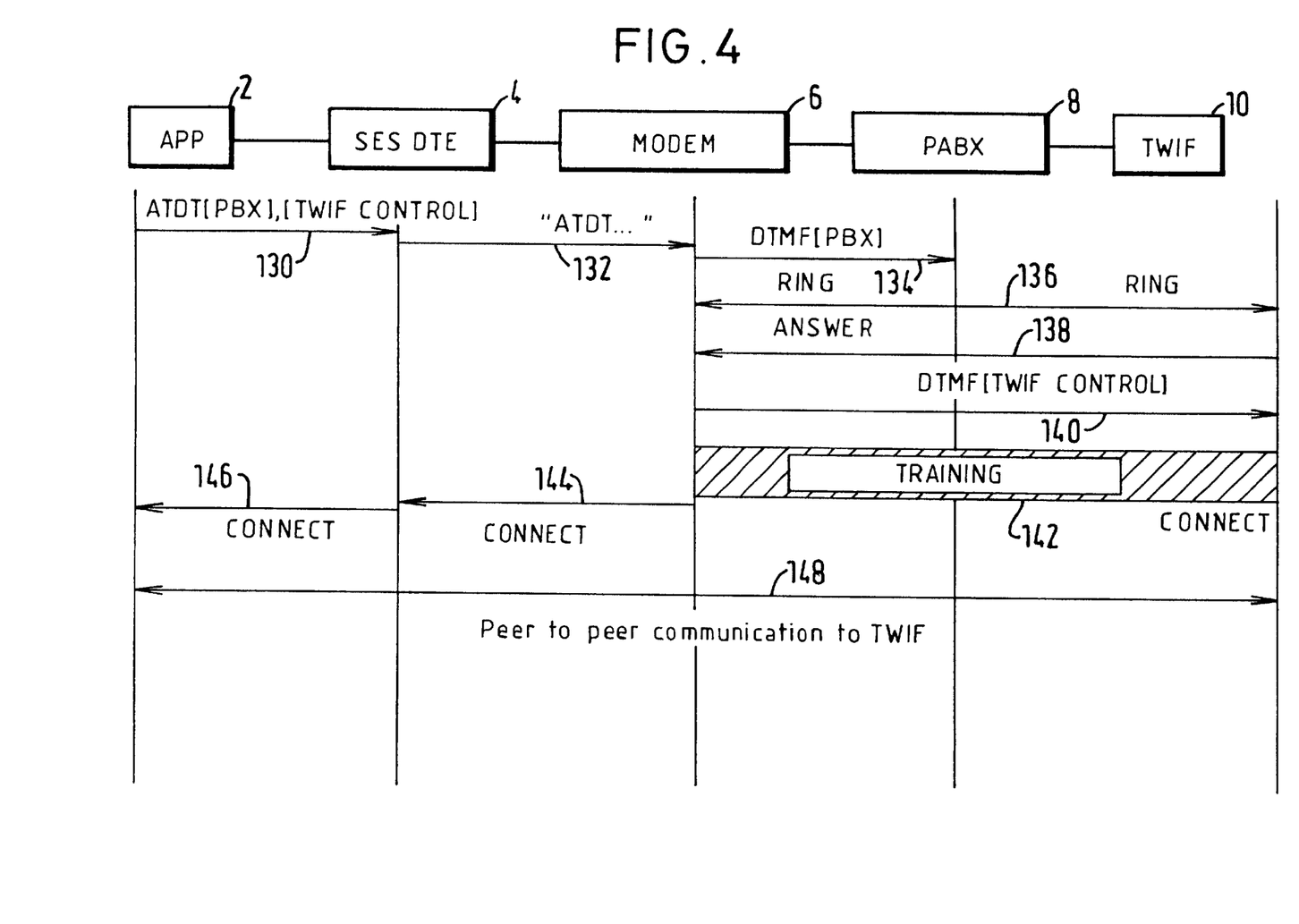
FIG. 4 is a protocol diagram showing set up of communication between the shipboard data terminal and the two-wire data interface of FIGS. 1 and 2.

The configuration settings of the TWIF 10 can be controlled by the shipboard data terminal 4, as shown in FIG. 4. At step 130, the application 2 generates an AT dialling string of the following format:

ATD[P/T][PBX],[TWIF Control].

This is sent as a data sequence to the modem 6 at step 132. The modem 6 dials the TWIF 10 using the [PBX] dialling code, at step 134. The PABX 8 rings the TWIF 10 at step 136 and the TWIF 10 answers at step 138, by going off-hook and optionally sending an answer signal. The modem 6 then sends dialling tones corresponding to the TWIF control codes at step 140, which set the TWIF 10 in remote configuration mode. If TWIF control is disabled by the configuration apparatus 48, the TWIF 10 goes on hook. TWIF control may be password protected, in which case part of the TWIF control codes comprises a password. TWIF control is only enabled if the password matches a code stored in the memory 50 of the TWIF 10, otherwise the TWIF 10 goes on hook. Provided that TWIF control is enabled, modem training then takes place at step 142 between the modem 6 and the TWIF 10 and once this is complete, the connect indication is sent at step 144 from the modem 6 to the shipboard DTE 4 and at step 146 from the shipboard DTE 4 to the application 2. The shipboard DTE 4 is now connected to the TWIF 10 and data can be sent to the TWIF 10, at step 148, to control the configuration of the TWIF 10. Data can also be sent from the TWIF 10 to the shipboard DTE 4, to report the status of the TWIF 10 or records of previous communications made through the TWIF 10.

SES Control

Figure 5:
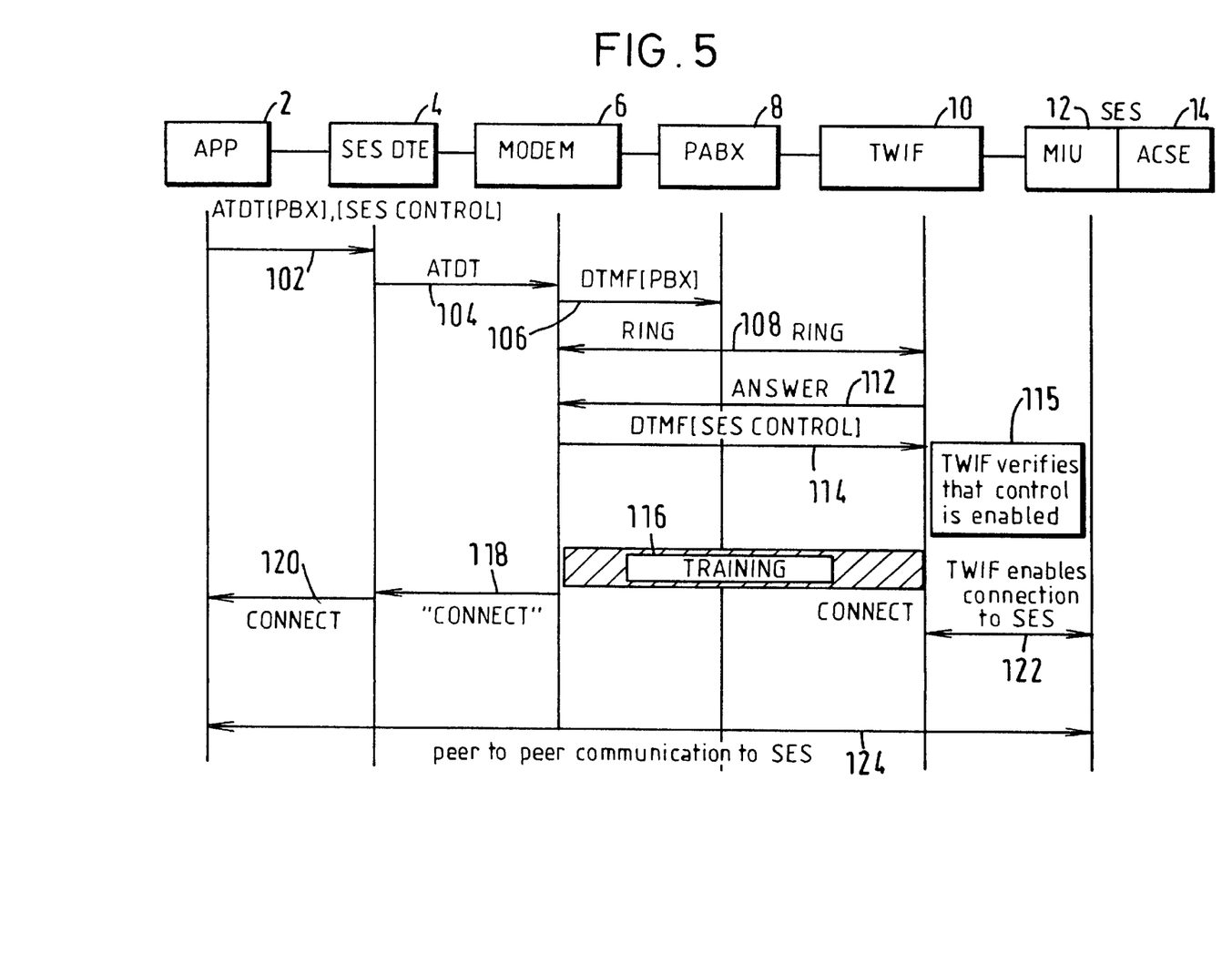
FIG. 5 is a protocol diagram showing set up of a communication between a shipboard terminal and a ship earth station of FIG. 1.

The TWIF 10 may also enable control of the configuration of the SES MIU 12 by the DTE 4, as shown in the protocol example of FIG. 5.

At step 102, the application 2 generates an ATDT dialling string of the following format:

ATD[P/T][PBX],[SES CONTROL]

where [PBX] is the dialling code of the TWIF 10 through the PABX 8 and [SES CONTROL] is an SES control code which enables control of the configuration of the SES 16.

The shipboard DTE 4 outputs the ATDT dialling string to the modem 6, at step 104. At step 106, the modem 6 outputs DTMF tones corresponding to the PBX dailling code of the TWIF 10, so that the PABX rings the TWIF 10 at step 108.

At step 112 the TWIF 10 goes off-hook and optionally sends an answer signal to the modem 6, which responds with DTMF tones corresponding to the SES control code, at step 114.

The TWIF 10 converts the DTMF tones to a corresponding digital code and compares the digital code with a predetermined SES control code. If the codes match, the TWIF 10 determines at step 115 whether it is currently configured to enable control of the SES 16. If it is, it then initiates training with the modem 6 at step 116, otherwise the TWIF 10 goes on hook.

Once training is complete, the modem 6 sends a connect signal at step 118 to the shipboard DTE 4, which in turn indicates successful connection to the application 2 at step 120.

In response to successful training at step 116, the TWIF 10 enables the connection to the SES 16, at step 122, so that transparent communication can then take place between the shipboard DTE 4 and the SES 16, at step 124. For example, the shipboard DTE 4 may then send a further dialling sequence to the SES MIU 12 so as to set up a call over the satellite link.

The SES control code therefore acts as a password for gaining access to the SES 16 from the shipboard DTE 4. The predetermined SES control code may be set by the configuration apparatus 48 or by previous communication from the shipboard DTE 4 or another shipboard DTE. The SES control code may contain, in addition to the password, control codes for setting parameters of the TWIF 10 or the SES 16.

The above embodiments have been described with reference to a mobile satellite communication system, but it will be understood that the inventive concepts embodied in the TWIF 10 can be applied to any interface apparatus which is connected between an analog line and a digital link and is required to output digital control codes in response to dialling tones or pulses or other analog dialling indications.

Likewise, the aspect of delayed training initiated by the TWIF is applicable to other situations in which a communications link comprises two or more sub-links and training must take place on two or more the sub-links.

In the embodiments that are described above, apparatus has been described in terms of functional blocks. The skilled person may readily devise specific implementations of these functional blocks. The description of apparatus as two separate functional blocks does not necessarily imply that the functional blocks correspond to discrete units. For example, the SES MIU 12 may be integrated with the SES 16 and the connection therebetween may be an internal connection. The two-wire data interface 10 may be a separate unit from either a PABX or a modem interface unit and have input/output ports for connection to such equipment, in which case the TWIF 10 may output control codes to a modem interface. Alternatively, the TWIF 10 may be integrated with a modem interface unit and may control training by the modem interface unit in synchronism with remote training over a remote sub-link.

What is claimed is:

1. Communications interface apparatus, comprising:
   an analog communications port for connection to an analog communications link;
   a digital communications port for connection to a digital communications link;
   memory for storing a password code;
   a receiver for receiving analog dialling signals including a password to establish a call from said analog communications link;
   a modem for converting the analog dialling signals to digital codes; and
   a processor for determining whether a password in the digital codes match the password code, and selectively enabling communication between said analog communications port and said digital communications port in response to a positive determination.

2. Data communications interface apparatus for connection between a first modem connected to a first analog communications link and a second modem connected to a second analog communications link, comprising:
   means for initiating a first handshake with the first modem over the first analog communications link; and
   means for delaying completion of said first handshake after initiating said first handshake so as substantially to synchronise the completion of said first handshake with completion of a second handshake performed with the second modem over the second analog communications link based on progress of said second handshake, said means for delaying including means for determining the progress of said second handshake with the second modem over the second analog communications link.

3. Apparatus as claimed in claim 2, wherein said means for delaying comprises a timer responsive to an event during initiation of a call from the first modem to the second modem, the means for performing said first handshake being arranged to begin said first handshake after a predetermined period determined by said timer.

4. Apparatus as claimed in claim 2, wherein said means for delaying comprises:
   means for detecting a connection signal from the second communications link indicative of the connection of a call to the second modem, the means for performing said first handshake being arranged to initiate said first handshake in response to detection of said connection signal.

5. Apparatus as claimed in claim 4, including a timer responsive to detection of said connection signal, the means for performing said first handshake being arranged to begin said first handshake after a predetermined period determined by said timer.

6. Apparatus as claimed in claim 2, wherein said means for delaying comprises:
   means for detecting a handshake progress signal indicative of the progress of said second handshake;
   means for determining whether the progress indicated by the handshake progress signal is less advanced than the progress of the first handshake and means for delaying the progress of the first handshake in response to a positive determination by said determining means such that the progress of the first handshake corresponds substantially to the progress of the second handshake indicated by the handshake progress signal.

7. Apparatus as claimed in claim 6, wherein the progress delaying means is arranged to delay the progress of the first handshake by failing to respond to a handshaking signal from the first modem.

8. Apparatus as claimed in any one of claims 2 to 11, arranged to be connected to said second analog communications link via a wireless communications link.

9. Apparatus as claimed in claim 8, wherein said wireless communications link comprises a satellite communications link.

10. A satellite earth station including apparatus as claimed in claim 9.

11. A method of providing an interface between an analog communications link and a digital communications link, comprising:
    storing a password code;
    receiving analog dialling signals including a password to establish a call from said analog communications link;
    converting the analog dialling signals to digital codes;
    determining whether a password in the digital codes matches the password code; and
    selectively enabling communication between said analog communications link and said digital communications link in response to a positive determination at said determining step.

12. A method of providing an interface between a first modem connected to a first analog communications link and a second modem connected to a second analog communications link, comprising:
    initiating a first handshake with the first modem over the first analog communications link;
    after initiating said first handshake, determining progress of a second handshake with the second modem over the second analog communications link; and
    delaying completion of said first handshake based on the progress of said second handshake so as substantially to synchronise the completion of said first handshake with the completion of the second handshake.

* * * * *